United States Patent [19]
Okamoto

[11] Patent Number: 5,987,365
[45] Date of Patent: Nov. 16, 1999

[54] ELECTRONIC CONTROL APPARATUS FOR VEHICLE

[75] Inventor: Masato Okamoto, Nishikamo-gun, Japan

[73] Assignee: Toyota Jidosha Kabushiki Kaisha, Toyota, Japan

[21] Appl. No.: 08/754,752

[22] Filed: Nov. 20, 1996

[30] Foreign Application Priority Data

Dec. 4, 1995 [JP] Japan ............................ 7-315376

[51] Int. Cl.⁶ .......................... F02D 45/00; G06F 11/30
[52] U.S. Cl. ......................... 701/29; 701/31; 701/33; 701/34; 395/183.09; 395/184.01
[58] Field of Search .................... 701/29, 33, 34, 701/35, 92, 97; 395/183.09, 184.01

[56] References Cited

U.S. PATENT DOCUMENTS

| 4,881,227 | 11/1989 | Buhren | 395/182.09 |
| 5,436,837 | 7/1995 | Gerstung et al. | 701/29 |

FOREIGN PATENT DOCUMENTS

| 32 26 195 C2 | 2/1983 | Germany . |
| 37 20 385 A1 | 12/1987 | Germany . |
| A-57-5518 | 1/1982 | Japan . |
| A-5-71410 | 3/1993 | Japan . |
| A-5-231233 | 9/1993 | Japan . |

Primary Examiner—Tan Q. Nguyen
Attorney, Agent, or Firm—Oliff & Berridge, PLC

[57] ABSTRACT

Disclosed is an electronic control apparatus which performs various kinds of controls associated with the driving of a vehicle. This electronic control apparatus has two electronic control units (ECUs) that are functionally assigned to associated various kinds of controls including the engine control and that independently execute the associated controls. Each ECU has a main central processing unit (CPU) and a sub CPU. The main CPU and sub CPU monitor the operational states of the other. When the local ECU is normal, the main CPU sends a run pulse signal to the mating ECU via a communication line. When the main CPU and sub CPU are normal, each ECU sends another run pulse signal to the mating ECU via the communication line. Each ECU monitors the two run pulse signals sent from the other ECU to determine an abnormality in the mating ECU.

20 Claims, 5 Drawing Sheets

ELECTRONIC CONTROL APPARATUS FOR VEHICLE

BACKGROUND OF THE INVENTION

1. Field of the Invention

The present invention relates generally to an electronic control apparatus that is adapted for various kinds of controls associated with the driving of a vehicle. More particularly, this invention relates to an electronic control apparatus equipped with a plurality of computers, which are functionally assigned to associated various kinds of controls including the engine control of a vehicle and which separately execute the associated controls.

2. Description of the Related Art

There are known electronic control apparatuses that perform the general electronic control of devices to be mounted on a vehicle such as the engine, transmission and suspension system. This type of electronic control apparatus comprises an arithmetic operation control circuit, which includes an input signal processing circuit, an arithmetic operation circuit, an output signal processing circuit (driving circuit) and a power circuit. One example of such an electronic control apparatus has a plurality of computers which are functionally assigned to associated various kinds of controls including the engine control and which independently execute the associated controls. The electronic control apparatus having a plurality of computers permits the individual computers to monitor the operational states of the other computers so that the operational state of the entire apparatus can be monitored.

Japanese Unexamined Patent Publication No. Sho 63-183254 discloses a computer system monitoring apparatus that has two computers (processors). As shown in FIG. 5, first and second processors 60 and 70, which constitute this monitoring apparatus, each have data bus and handshake bus ports 61 and 71, which are connected together by a data line and a control line 67. The processors 60 and 70 have exclusive watchdog output terminals 62 and 74 for issuing dynamic monitor signals, i.e., rectangular signals that invert every given period, to the mating processors 70 and 60. The processors 60 and 70 also have exclusive software reset output terminals 63 and 75 for issuing static reset signals, i.e., high-level or low-level signals, to the mating processors 70 and 60. The processors 60 and 70 send the monitor signals from the watchdog output terminals 62 and 74 to associated AND gates 79 and 80 via associated pumping circuits 77 and 78. Likewise, the processors 60 and 70 send the static reset signals from the reset output terminals 63 and 75 to the associated AND gates 79 and 80. The processors 60 and 70 further have watchdog detection terminals 64 and 72, which receive the monitor signals from the associated pumping circuits 78 and 77 via associated lead lines 85 and 89. The processors 60 and 70 have reset terminals 65 and 73, which receive the signals from the associated AND gates 80 and 79 via associated OR gates 82 and 81 and lead lines 86 and 90. Based on the monitor signals and reset signals acquired from the terminals 64, 72, 65 and 73, the processors 60 and 70 monitor the operational states of the other and specify an abnormality when one occurs in the engine or other location.

In the above-described monitoring apparatus disclosed in the Japanese publication, the lead lines 89 and 85 between the pumping circuits 77 and 78 and the associated watchdog detection terminals 72 and 64, and the lead lines 90 and 86 between the AND gates 79 and 80 and the associated reset terminals 73 and 65 carry high-level or low-level static signals. When any of the lead lines 89, 85, 90 and 86 is disconnected or short-circuited, therefore, the apparent signal which should be input from the disconnected or short-circuited lead line 89, 85, 90 or 86 to the associated terminals 72, 64, 73 and 65 is fixed at the low level or the high level. Accordingly, the processors 60 and 70 cannot detect the disconnection or short-circuiting of the lead line 89, 85, 90 or 86 as an abnormality. In addition, the processors 60 and 70 cannot specify the type of the abnormality.

For example, suppose a low-level signal is input to the reset terminal 73 of the second processor 70 via the lead line 90 at the normal time. Suppose that this lead line 90 is short-circuited and the second processor 70 has just failed to perform the proper operation for some reason. In this case, the first processor 60 detects through the detection terminal 64, that the watchdog signal has not been sent from the output terminal 74 of the second processor 70, and thus detects an abnormality in the processor 70. At this time, the first processor 60 sends out the reset signal from the reset output terminal 63 to reset the operation of the second processor 70. As the lead line 90 is short-circuited, however, the first processor 60 cannot supply the high-level reset signal indicative of an abnormality in the second processor 70 to the reset terminal 73 of the second processor 70. As a result, the abnormal operation of the second processor 70 cannot be stopped immediately.

SUMMARY OF THE INVENTION

Accordingly, it is a primary objective of the present invention to provide an electronic control apparatus that is equipped with a pair of computers that are functionally assigned to associated various kinds of controls, including the engine control of a vehicle, and that independently execute the associated controls, properly detect the occurrence of an abnormality in each computer, and specify the location of the abnormality.

To achieve the foregoing and other objects and in accordance with the purpose of the present invention, an electronic control apparatus for a vehicle is provided. The apparatus executes a plurality of controls associated with driving of the vehicle. The apparatus comprises a first computer and a second computer for independently executing controls, wherein each computer is functionally assigned to and executes at least one associated control, and wherein each computer monitors operational states of other computer, a main processor and an associated sub processor provided in each computer, wherein the main processor executes the assigned control and monitors an operational state of the associated sub processor and determines whether the operational state of the associated sub processor is abnormal, and wherein the sub processor monitors an operational state of the main processor associated therewith and determines whether the operational state of the associated main processor is abnormal. The apparatus comprises a transmitting means associated with each computer, wherein the transmitting means transmits a determining signal to the other computer when at least one of the main processor and the sub processor in the associated computer determines that the operational state of the other processor is abnormal, an abnormality detecting means provided in each computer, wherein the abnormality detecting means detects an abnormality of the other computer based on the determining signal transmitted from the transmitting means of the other computer, a warning means for warning of the abnormality, wherein the warning means operates when the abnormality detecting means detects an abnormality of the other computer, and a restricting means associated with each computer, wherein each restricting means restricts execution of at least one assigned control of the associated computer when at least one of the main processor and the sub processor determines that the operational state of the other processor is abnormal.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

An electronic control apparatus for a vehicle according to one embodiment of the present invention as adapted for use in an automobile will be now described with reference to the accompanying drawings.

Figure 4:
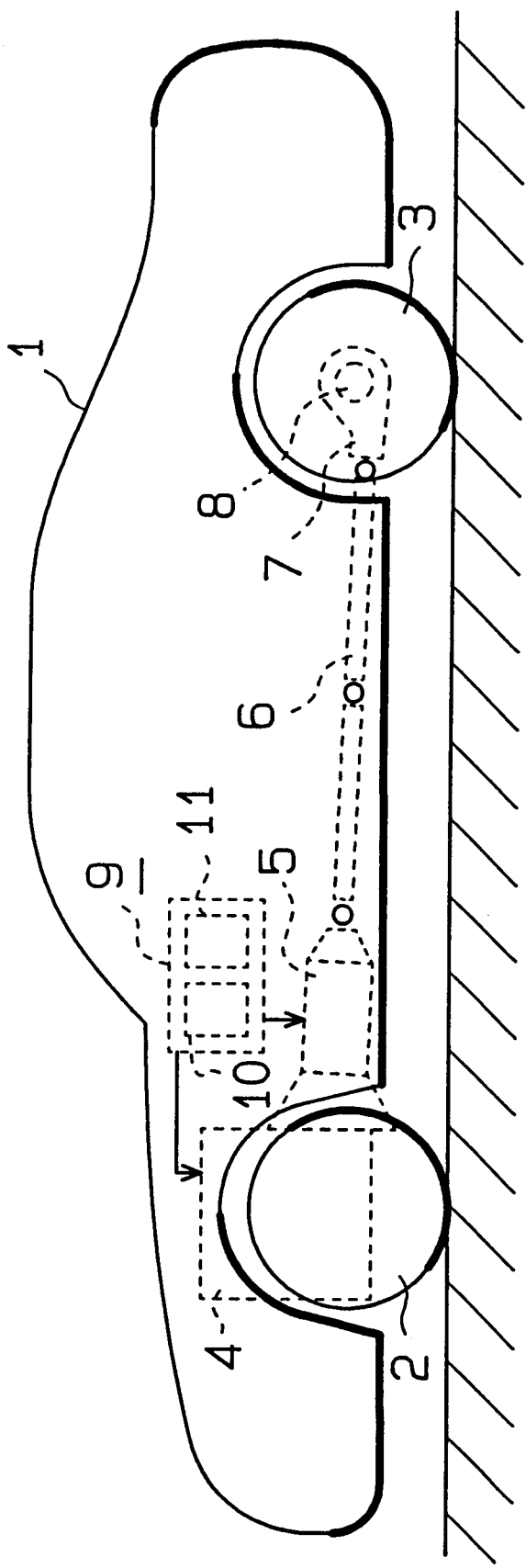
FIG. 4 is a schematic diagram depicting a vehicle.
Figure 5:
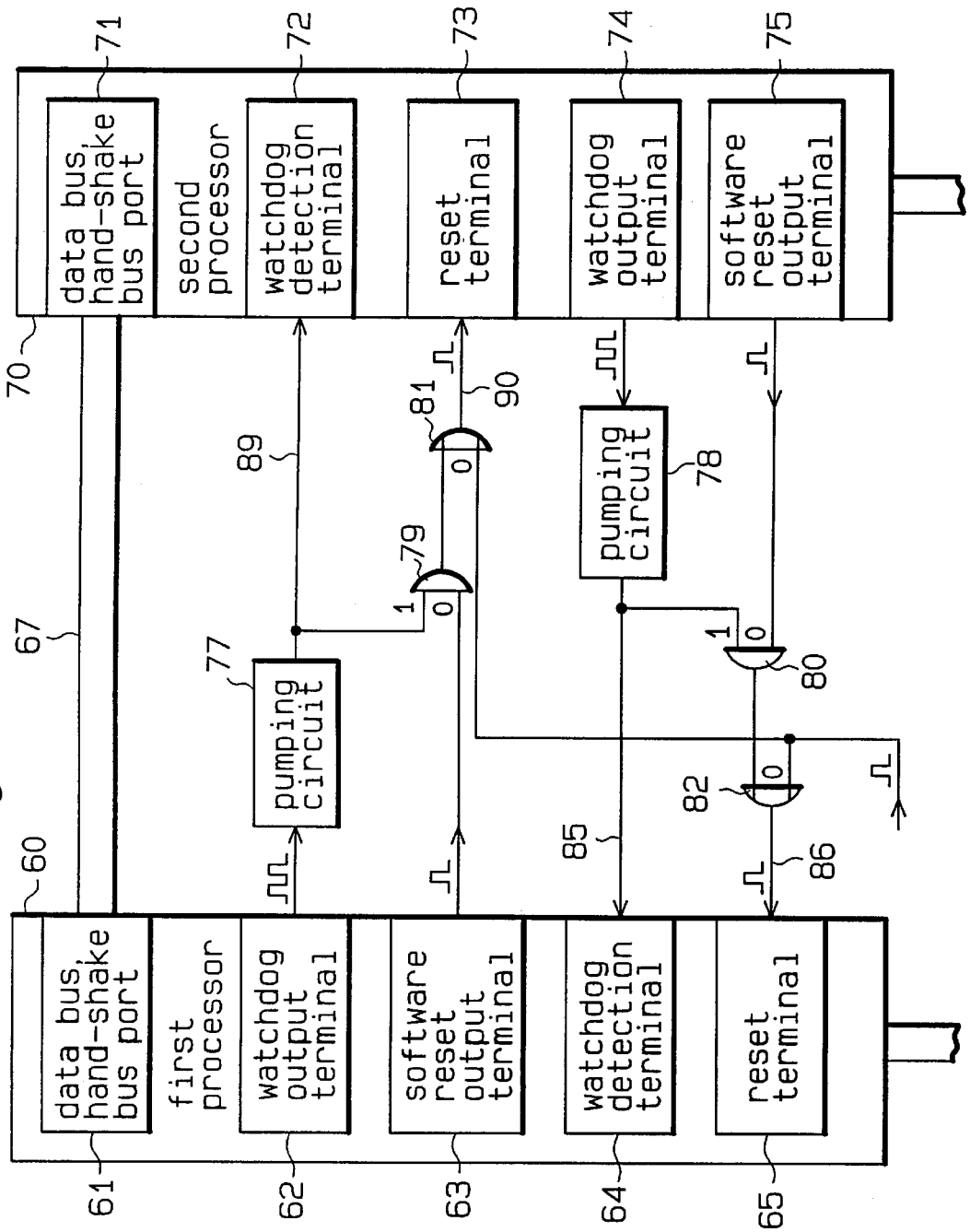
FIG. 5 is a block circuit diagram illustrating a conventional computer system monitoring apparatus.

FIG. 4 presents a schematic diagram depicting a vehicle 1 according to this embodiment. This vehicle 1 has non-driving wheels 2 and driving wheels 3 and has a V-type 12-cylinder engine 4 mounted in the front. An electronically controlled automatic transmission 5, which is coupled to the output shaft (not shown) of the engine 4, is coupled to the driving wheels 3 via a propeller shaft 6, a differential gear 7 and a drive shaft 8. An electronic control apparatus 9 mounted on the vehicle 1 has first and second electronic control units (ECUs) 10 and 11 as first and second computers. In this embodiment, the computer including each ECU 10 or 11 includes at least a storage unit, an arithmetic operation unit, a control unit and an input/output unit. The storage unit stores information, commands and the like. The arithmetic operation unit executes, among other things, four arithmetic operations and conventional logic operations. The control unit decodes commands and controls the mating control unit. The input/output unit receives and sends information from and to an external unit.

The ECUs 10 and 11 are functionally assigned to associated various kinds of controls concerning the driving of the vehicle 1 such as control of the engine 4 and control of the automatic transmission 5 and independently execute the associated controls. In addition, each ECU 10 or 11 monitors the other ECU to check if the other ECU is properly functioning. The vehicle 1 is also equipped with a traction control (TRC) system and an anti-lock brake system (ABS).

Figure 3:
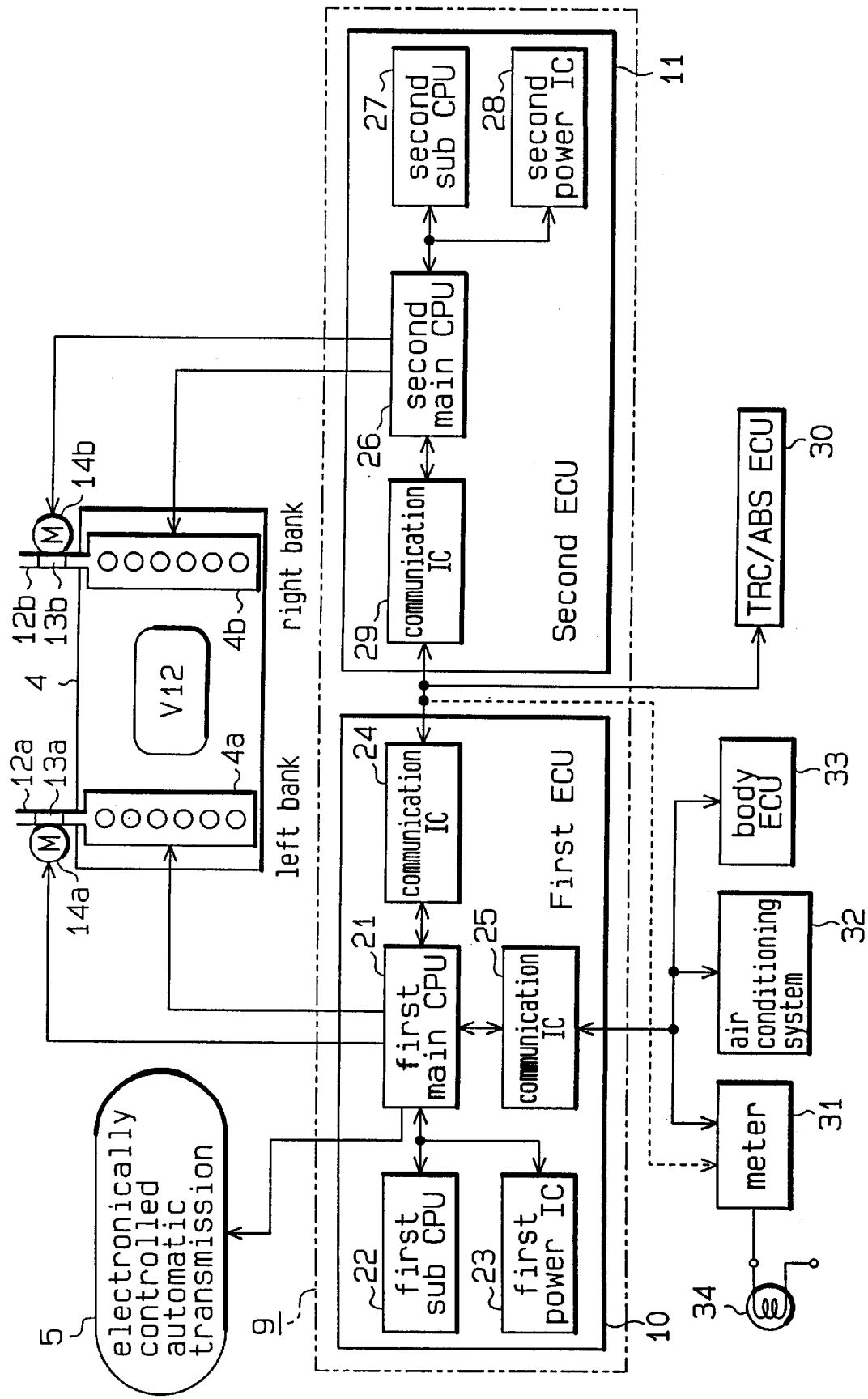
FIG. 3 is a schematic structural diagram showing an electronic control apparatus and an object to be controlled by this apparatus.

FIG. 3 schematically illustrates the structure of the electronic control apparatus 9 and the engine 4 and the automatic transmission 5 that are to be controlled by this apparatus 9. Each of left and right banks 4a and 4b of the engine 4 has six cylinders. Two air-intake passages 12a and 12b provided in association with the banks 4a and 4b supply outside air to the individual cylinders of the banks 4a and 4b. Linkless throttle valves 13a and 13b, which are provided in the respective air-intake passages 12a and 12b, are driven by motors 14a and 14b, respectively. The throttle valve 13a or 13b adjusts the amount of air to be supplied to the individual cylinders of the associated bank 4a or 4b. Fuel supply devices (not shown) provided for each of the banks 4a and 4b adjust the amounts of fuel to be supplied to the cylinders of the associated banks 4a and 4b. An ignition device (not shown) provided for each of the banks 4a and 4b controls the ignition timing for a air-fuel mixture in the cylinders of the associated bank 4a or 4b. The automatic transmission 5 is designed to have four gears.

The first ECU 10 has a first main central processing unit (CPU) 21 as the main processor, a first sub CPU 22 as a sub processor, a first power integrated circuit (IC) 23 and two communication ICs 24 and 25. In this embodiment, the processor that includes the main CPU and the sub CPU comprises the arithmetic operation unit and the control unit among the four units included in the computer described above. The main CPU 21 independently performs control associated with the left bank 4a of the engine 4 and control of the automatic transmission 5. The sub CPU 22 monitors the operational state of the main CPU 21. The power IC 23 supplies power to the individual CPUs 21 and 22 and monitors the operational state of the main CPU 21. The communication ICs 24 and 25 exclusively exchange predetermined data and other signals necessary for various controls between the other circuitry not included in the first ECU 10 and the main CPU 21.

The second ECU 11 has a second main CPU 26 as the main processor, a second sub CPU 27 as a sub processor, a second power IC 28 and one communication IC 29. The main CPU 26 independently performs control associated with the right bank 4b of the engine 4. The sub CPU 27 monitors the operational state of the main CPU 26. The first and second sub CPUs 22 and 27 have simple structures that can handle 1 bit of information at most. The power IC 28 supplies power to the individual CPUs 26 and 27 and monitors the operational state of the main CPU 26. The communication IC 29 exclusively exchanges predetermined data and other signals necessary for various controls with the communication IC 24 in the first ECU 10.

The first main CPU 21 in the first ECU 10 exchanges information necessary for control with a meter 31 provided on the inner panel (not shown) of the vehicle 1, an air conditioning system 32 mounted on the vehicle 1 and a body ECU 33 via the communication IC 25. The meter 31 controls an alarm lamp 34. When an abnormality occurs in the electronic control apparatus 9, the first or second ECU 10 or 11 detects the event and sends the detection result to the meter 31. Upon reception of the detection result, the meter 31 drives the alarm lamp 34. The main CPUs 21 and 26 in both ECUs 10 and 11 exchange information necessary for control with a TRC/ABS.ECU 30 via the communication ICs 24 and 29. The TRC/ABS.ECU 30 controls the TRC system and the ABS, which are mounted on the vehicle 1.

Figure 1:
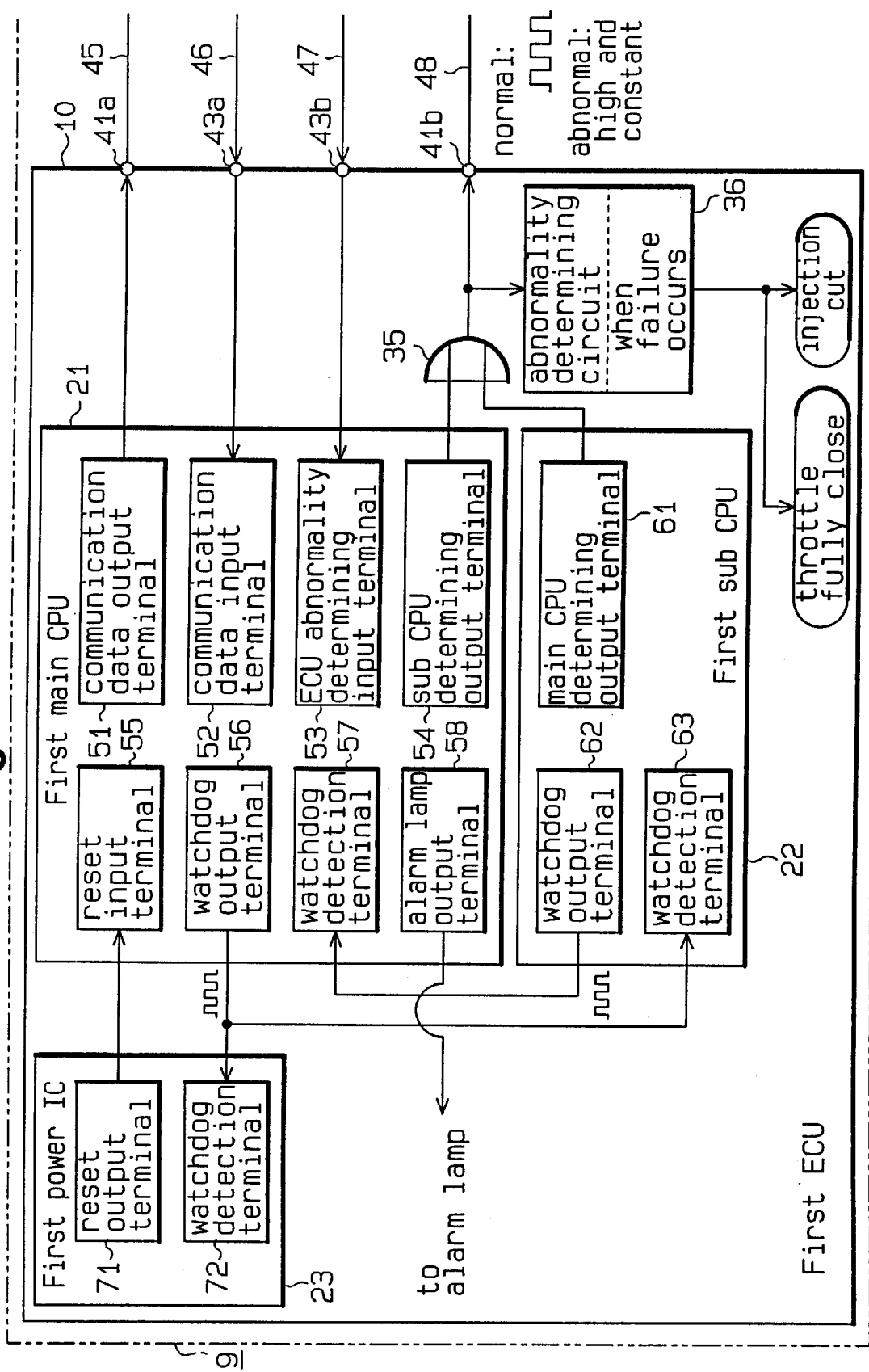
FIG. 1 is a block circuit diagram illustrating the structure of a first ECU according to one embodiment of this invention.
Figure 2:
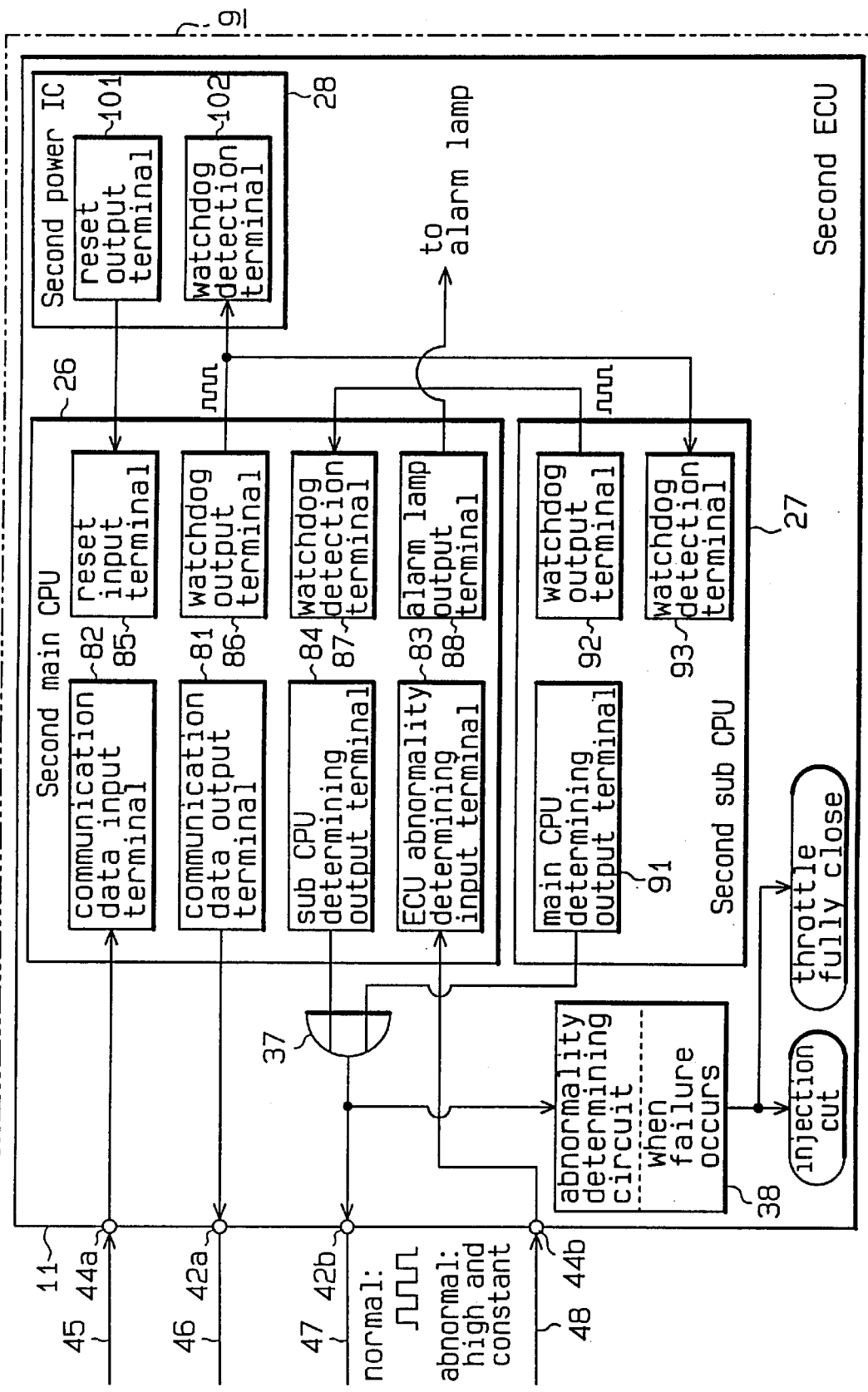
FIG. 2 is a block circuit diagram showing the structure of a second ECU.

FIGS. 1 and 2 illustrate the detailed structures of the first and second ECUs 10 and 11; however, the individual communication ICs 24, 25 and 29 shown in FIG. 3 are omitted in both diagrams. The ECU 10 has first and second external output terminals 41a and 41b and first and second external input terminals 43a and 43b, and the ECU 11 likewise has first and second external output terminals 42a and 42b and first and second external input terminals 44a and 44b.

A first communication line 45 is connected between the first external output terminal 41a of the first ECU 10 and the first external input terminal 44a of the second ECU 11. Likewise, a second communication line 46 is connected between the first external input terminal 43a of the first ECU 10 and the first external output terminal 42a of the second ECU 11. Those two communication lines 45 and 46 allow the ECUs 10 and 11 to exchange predetermined data necessary for controls with each other. Communication data necessary for controls between both ECUs 10 and 11 flow through the communication lines 45 and 46. When the main CPU 21 or 26 fails, however, data contents become unsettled or no data is sent.

A first monitor line 47 is connected between the second external input terminal 43b of the first ECU 10 and the second external output terminal 42b of the second ECU 11. Likewise, a second monitor line 48 is connected between the second external output terminal 41b of the first ECU 10 and the second external input terminal 44b of the second ECU 11. Those two monitor lines 47 and 48 allow the ECUs 10 and 11 to exchange predetermined signals necessary for monitoring the operational states of the ECUs 10 and 11 with each other.

As shown in FIG. 1, the first ECU 10 has an OR gate 35 and an abnormality determining circuit 36 in addition to the main CPU 21, the sub CPU 22 and the power IC 23. This abnormality determining circuit 36 is connected to a driving circuit (not shown) for the fuel supply device of the left bank 4a and a driving circuit (not shown) for the motor 14a for the throttle valve 13a.

The first main CPU 21 has a communication data output terminal 51, a communication data input terminal 52, an ECU abnormality determining input terminal 53, a sub CPU determining output terminal 54, a reset input terminal 55, a watchdog output terminal 56, a watchdog detection terminal 57 and an alarm lamp output terminal 58.

The first sub CPU 22 has a main CPU determining output terminal 61, a watchdog output terminal 62 and a watchdog detection terminal 63.

The first power IC 23 has a reset output terminal 71 and a watchdog detection terminal 72.

As shown in FIG. 2, the second ECU 11 has an OR gate 37 and an abnormality determining circuit 38 in addition to the main CPU 26, the sub CPU 27 and the power IC 28. This abnormality determining circuit 38 is connected to a driving circuit (not shown) for the fuel supply device of the right bank 4b and a driving circuit (not shown) for the motor 14b for the throttle valve 13b.

The second main CPU 26 in this ECU 11 has a communication data output terminal 81, a communication data input terminal 82, an ECU abnormality determining input terminal 83, a sub CPU determining output terminal 84, a reset input terminal 85, a watchdog output terminal 86, a watchdog detection terminal 87 and an alarm lamp output terminal 88.

The second sub CPU 27 has a main CPU determining output terminal 91, a watchdog output terminal 92 and a watchdog detection terminal 93.

The second power IC 28 has a reset output terminal 101 and a watchdog detection terminal 102.

As apparent from the above, both ECUs 10 and 11 have the same fundamental structures, so that only the structure of the first ECU 10 will be discussed further to avoid a redundant description of the structure of the second ECU 11. Readers should be able to apply the description of the first ECU 10 to the description of the second ECU 11 to easily understand the structure of the second ECU 11.

The output terminal 56 of the main CPU 21 in the first ECU 10 is connected to the detection terminals 63 and 72 of the sub CPU 22 and the power IC 23. The main CPU 21 sends a watchdog pulse signal, which inverts every given period, to the detection terminals 63 and 72 of the sub CPU 22 and the power IC 23 from its output terminal 56. When the operation of the main CPU 21 is normal, the pulse signal output from the output terminal 56 is normal. When the operation of the main CPU 21 is abnormal, the pulse signal output from the output terminal 56 becomes abnormal. The sub CPU 22 monitors the pulse signal, which is detected by the detection terminal 63. Based on that pulse signal, the sub CPU 22 determines if the main CPU 21 is properly functioning.

The output terminal 62 of the sub CPU 22 is connected to the detection terminal 57 of the main CPU 21. The sub CPU 22 sends a watchdog pulse signal, which inverts every given period, to the detection terminal 57 of the main CPU 21 from its output terminal 62. When the operation of the sub CPU 22 is normal, the pulse signal output from the output terminal 62 is normal. When the operation of the sub CPU 22 is abnormal, the pulse signal output from the output terminal 62 becomes abnormal. The main CPU 21 monitors the pulse signal which is detected by the detection terminal 57. Based on that pulse signal, the main CPU 21 determines if the sub CPU 22 is properly functioning.

According to this embodiment, both CPUs 21 and 22 exchange the watchdog pulse signals necessary for the monitoring purpose with each other via the output terminals 56 and 62 and the detection terminals 57 and 63. Accordingly, both CPUs 21 and 22 monitor the operational states of the mating CPUs 22 and 21.

The output terminal 71 of the power IC 23 is connected to the input terminal 55 of the main CPU 21. The power IC 23 monitors the pulse signal, which is detected by the detection terminal 72. Based on this pulse signal, the power IC 23 determines if the main CPU 21 is properly functioning. When determining that the main CPU 21 is abnormal, the power IC 23 sends out the reset signal to forcibly stop the operation of the main CPU 21, to the input terminal 55 of the main CPU 21 from the output terminal 71. In this case, power supply to the main CPU 21 is forcibly inhibited.

The output terminal 51 of the main CPU 21 is connected to the external output terminal 41a. The main CPU 21 outputs predetermined communication data necessary for the second ECU 11 to execute various controls from the output terminal 51. This communication data includes a run pulse signal as a dynamic signal indicative of the normal state of the main CPU 21. This run pulse signal consists of a dynamic signal that inverts every given period. This communication data is sent via the communication line 45 to the external input terminal 44a of the second ECU 11 from the external output terminal 41a, and is received by the communication data input terminal 82 of the second main CPU 26.

The input terminal 52 of the main CPU 21 is connected to the external input terminal 43a. The main CPU 21 receives at the input terminal 52 predetermined communication data, which is sent from the output terminal 81 of the second ECU 11 in the manner described above and is sent via the external output terminal 42a, the communication line 46 and the external input terminal 43a. The input communication data includes a run pulse signal indicative of the normal state of the second main CPU 26 of the second ECU 11. In other words, predetermined data, which is to be exchanged between both ECUs 10 and 11 to match their controls and which is associated with control of the mating ECU, is sent to the input terminal 52. At the same time, the run pulse signal indicating the monitor result associated with the operation state of the main CPU 26 of the mating ECU 11 is sent to the input terminal 52. In this embodiment, the main CPU 21 which includes the output terminal 51 and the input terminal 52 is equivalent to communication means.

Lists of communication data output from the output terminals 51 and 81 of the main CPUs 21 and 25 in the first and second ECUs 10 and 11 will be given in the following Tables 1 and 2.

TABLE 1

List of Communication Data Output From Communication Data Output Terminal of First Main CPU (Related Portion)

| First main CPU determination signal | normal: run pulse signal inverting every given period 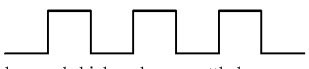 abnormal: high or low unsettled |
|---|---|
| First sub CPU determination signal | normal: low abnormal: high |
| Monitor line & peripheral circuit determination signal | normal: low abnormal: high |

TABLE 2

List of Communication Data Output From Communication Data Output Terminal of Second Main CPU (Related Portion)

| Second main CPU determination signal | normal: run pulse signal inverting every given period 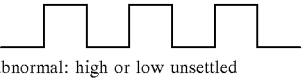 abnormal: high or low unsettled |
|---|---|
| Second sub CPU determination signal | normal: low abnormal: high |
| Monitor line & peripheral circuit determination signal | normal: low abnormal: high |

It is apparent from Tables 1 and 2 that when each main CPU 21 or 26 is normal, the main CPU determination signal has a run pulse signal that repeatedly inverts every given period. When each main CPU 21 or 26 determination he main CPU determination signal has an unsettled signal of a high level or a low level.

The sub CPU determination signal indicates the result of the determination associated with each associated sub CPU 22 or 27 which is made based on what is received by the associated watchdog detection terminal 57 or 87. When each sub CPU 22 or 27 is normal, the determination signal has a low level. When each sub CPU 22 or 27 is abnormal, the determination signal has a high level.

The monitor line and peripheral circuit determination signal indicate the result of the determination associated with each associated monitor line 47, 48 which is made based on what is received by the associated abnormality determining input terminal 53 or 83. When each monitor line 47, 48 is normal, the determination signal has a low level. When each monitor line 47, 48 is abnormal, the determination signal has a high level.

The determining output terminal 54 of the main CPU 21 in the first ECU 10 is connected to the first input terminal of the OR gate 35. When determining that the sub CPU 22 is normal, the main CPU 21 sends a run pulse signal, which inverts every given period, to the OR gate 35 from the determining output terminal 54. When determining that the sub CPU 22 is abnormal, the main CPU 21 sends a high-level signal to the OR gate 35 from the determining output terminal 54.

The determining output terminal 61 of the sub CPU 22 is connected to the second input terminal of the OR gate 35. When determining that the main CPU 21 is normal, the sub CPU 22 sends a low-level signal to the OR gate 35 from the determining output terminal 61. When determining that the main CPU 21 is abnormal, the sub CPU 22 sends a high-level signal to the OR gate 35 from the determining output terminal 61.

The output terminal of the OR gate 35 is connected to the external output terminal 41b and the abnormality determining circuit 36. When the run pulse signal indicative of the normal state of the sub CPU 22 and the low-level signal indicative of the normal state of the main CPU 21 are sent to the OR gate 35, the OR gate 35 issues a normal run pulse signal (dynamic signal) indicative of the normal state of the first ECU 10 as the monitor signal. When the high-level signal indicative of the abnormal state of the sub CPU 22 or the high-level signal indicative of the abnormal state of the main CPU 21 is sent to the OR gate 35, the OR gate 35 issues a high-level signal indicative of the abnormal state of the first ECU 10 as the monitor signal. Those monitor signals are sent via the monitor line 48 to the external input terminal 44b of the second ECU 11 from the external output terminal 41b, and are then sent to the abnormality determining input terminal 83 of the main CPU 26.

In the described manner, the main CPU 21 including the determining output terminal 54, the sub CPU 22 including the determining output terminal 61 and the OR gate 35 send out the monitoring results. Suppose that the signals sent from the determining output terminals 54 and 61 of the CPUs 21 and 22 indicate that the operation states of the other CPUs 22 and 21 are normal. At this time, the OR gate 35 sends the normal run pulse signal, which inverts every given period, as the monitor signal to the mating second ECU 11 via the monitor line 48. Suppose that the signal sent from the determining output terminal 54 or 61 of the CPU 21 or 22 does not indicate that the operation states of the other CPU 22 or 21 is normal. Then, the OR gate 35 sends a high-level signal other than the normal run pulse signal, as the monitor signal, to the mating second ECU 11 via the monitor line 48.

The abnormality determining input terminal 53 of the main CPU 21 is connected to the external input terminal 43b. The main CPU 21 receives at the abnormality determining input terminal 53 the monitor signal, which is output from the OR gate 37 of the second ECU 11 in the manner described above and is sent via the output terminal 42b, the first monitor line 47 and the external input terminal 43b. The main CPU 21 monitors this monitor signal and communication data input to the communication data input terminal 52 to determine an abnormality associated with the mating ECU 11. The location of the abnormality can be specified by combining the content of the monitor signal and the content of the communication data.

Table 3 below shows the relationship among the contents of the communication data and the monitor signal, which is input to the main CPUs 21 and 26 in the first and second ECUs 10 and 11, and the location of an abnormality to be determined.

TABLE 3

| Abnormal Section | Communication Data | | | Monitor signal |
|---|---|---|---|---|
| | Main CPU determination signal | Sub CPU determination signal | Monitor line & peripheral circuit determination signal | |
| Main CPU | abnormal | unsettled | unsettled | abnormal |
| Sub CPU | normal | abnormal | normal | abnormal |
| Communication line | abnormal | unsettled | unsettled | normal |
| Monitor line & peripheral ciruit | normal | normal | abnormal | abnormal |

It is apparent from Table 3 that it is possible to specify whether the location of the abnormality is in the main CPU 21 or 26, the sub CPU 22 or 27, the communication line 45 or 46, or the monitor line 47 or 48 and the peripheral circuit by combining the contents of the main CPU determination signal, the sub CPU determination signal and the monitor line and peripheral circuit determination signal included in the communication data, and the content of the monitor signal.

When the main CPU 21 in the first ECU 10 detects an abnormality in the mating ECU 11, the main CPU 21 sends out a predetermined control signal from the alarm lamp output terminal 58 to drive the alarm lamp 34. Upon reception of this control signal, the meter 31 turns on the alarm lamp 34. In other words, the main CPU 21 including the alarm lamp output terminal 58 monitors the run pulse signal sent via the communication line 46 and the monitor line 47 to detect an abnormality in the mating ECU 11 in this embodiment.

The monitor signal from the OR gate 35 is sent to the abnormality determining circuit 36. Based on this monitor signal, the abnormality determining circuit 36 determines if the local ECU 10 is normal. When determining that the local ECU 10 is abnormal, the abnormality determining circuit 36 sends a predetermined control signal to the driving circuit for the fuel supply device in order to cut the fuel supply in the left bank 4a. When determining that the local ECU 10 is abnormal, the abnormality determining circuit 36 simultaneously sends a predetermined control signal to the driving circuit for the motor 14a in order to fully close the throttle valve 13a in the left bank 4a. In other words, when the OR gate 35 issues the high-level signal, the abnormality determining circuit 36 determines that the local ECU 10 is abnormal and restricts the operations of the fuel supply device and the throttle valve 13a in the left bank 4a.

According to the structure of this embodiment, as described above, the main CPUs 21 and 26 in the ECUs 10 and 11 are functionally assigned to associated various kinds of controls associated with the driving of the vehicle 1 and independently execute the associated controls. That is, the main CPUs 21 and 26 independently execute the assigned controls associated with the banks 4a and 4b of the engine 4. CPU 21 executes the assigned control associated with the automatic transmission 5. The sub CPUs 22 and 27 monitor the operational states of the main CPUs 21 and 26. The main CPU 21 or 26 and the sub CPU 22 or 27 monitor the operational states of the mating CPUs based on the watchdog pulse signals sent from the mating CPUs.

Assume that the main CPUs 21 and 26 and the sub CPUs 22 and 27 indicate that operational states of the mating CPUs are normal. Then, the OR gates 35 and 37 send the normal run pulse signals indicative of the normal states of both the main CPUs 21 and 26 and the sub CPUs 22 and 27 as the monitor signals to the mating ECUs 11 and 10 from the local ECUs 10 and 11 via the monitor lines 47 and 48.

Assume that the main CPUs 21 and 26 or the sub CPUs 22 and 27 do not indicate that operational states of the mating CPUs are normal. Then, the OR gate 35 or 37 sends the high-level signal indicative of the abnormal state of at least one of the main CPUs 21 and 26 and the sub CPUs 22 and 27 as the monitor signal to the mating ECU 11 or 10 from the local ECU 10 or 11 via the monitor line 47 or 48.

When the local ECU 10 or 11 is normal, the main CPU 21 or 26 sends communication data including the run pulse signal to the mating ECU 11 or 10 via the communication line 45 or 46. When the local ECU 10 or 11 is not normal, the main CPU 21 or 26 sends communication data including a given signal of a high level or a low level to the mating ECU 11 or 10.

The main CPU 21 or 26 monitors the communication data and the monitor signal, which are sent via the communication line 45 or 46 and the monitor line 47 or 48. Based on the contents of those signals, the main CPU 21 or 26 detects an abnormality in the mating ECU 11, 10 and determines the location of the abnormality. In this embodiment, the presence or absence of the run pulse signal in the communication data and the presence or absence of the run pulse signal in the monitor signal, both of which are monitored by the main CPU 21 or 26, are combined. Accordingly, it is possible to specify the abnormal state or normal state associated with the main CPU 21 or 26 or the sub CPU 22 or 27 in the mating ECU 11 or 10, and the abnormal state or normal state associated with the communication line 45 or 46 or the monitor line 47 or 48. It is there fore possible to properly detect an abnormality in each ECU 10 or 11 and specify the location of the abnormality to the main CPU 21 or 26, the sub CPU 22 or 27, the communication line 45 or 46, the monitor line 47 or 48. In this case, when the sub CPU 22 or 27 in each ECU 10 or 11 is abnormal, the main CPU 21 or 26 in that ECU 10 or 11 determines that abnormality. When the main CPU 21 or 26 in each ECU 10 or 11 is abnormal, on the other hand, the main CPU 26 or 21 in the mating ECU 11 or 10 determines that abnormality.

According to the structure of this embodiment, the OR gate 35 or 37 in each ECU 10 or 11 outputs a high-level monitor signal. At this time, the abnormality determining circuit 36 or 38 determines that the local ECU 10 or 11 is abnormal and restricts the operation of that which is controlled by the local ECU 10 or 11. Specifically, the fuel supply to the cylinders of each bank 4a or 4b in the engine 4 is stopped and the throttle valve 13a or 13b is fully closed to inhibit the supply of outside air.

It is thus possible to suppress the erroneous operation of that which is controlled by the local ECU 10 or 11 if an abnormality is found therein. When an abnormality occurs only in the first ECU 10, for example, this ECU 10 determines the abnormality through the abnormality determining circuit 36. Then, the ECU 10 stops supplying fuel and outside air to the cylinders of the left bank 4a to inhibit the combustion of the air-fuel mixture in each cylinder in the left bank 4a. This prevents the abnormal ECU 10 from erroneously controlling and operating the individual cylinders in the left bank 4a. In this case, the individual cylinders in the right bank 4b are controlled and operated by the normal second ECU 11, so that the engine 4 does not stop. Even if this abnormality occurs during the driving of the vehicle 1, the operation of the left bank 4a of the engine 4 stops and only the operation of the right bank 4b continues. Therefore, the engine 4 is run with only low power when there is an abnormality yet the driver can keep driving the vehicle 1 as needed. That is, it is possible to invalidate the functions associated with that which is controlled by the abnormal ECU 10, while it is possible to effectively use the functions associated with what is controlled by the remaining and normal ECU 11.

According to this embodiment, when either ECU 10 or 11 detects an abnormality in the mating ECU 11 or 10, the alarm lamp 34 is turned on. This allows the driver of the vehicle 1 to immediately know the abnormality in the ECU 10 or 11, s o that the driver can quickly cope with the ab normality associated with the ECU 10 or 11.

According to this embodiment, when an abnormality occurs in either main CPU 21 or 26 in the associate d ECU 10 or 11, the associated power IC 23 or 28 stops power supply to the abnormal main CPU 21 or 26. The operation of that which is controlled by the abnormal main CPU 21 or 26 can therefore be stopped immediately, thus preventing the operations of the control targets from being erroneously controlled.

In other words, according to this embodiment, when an abnormality occurs in either ECU 10 or 11, the mating ECU 11 or 10 detects the abnormality and turns on the alarm lamp 34 to inform the driver of the occurrence of the abnormality. However, each ECU 10 or 11 does not issue an instruction to stop the control of that which is controlled by the mating ECU 11 or 10. Each ECU 10 or 11 determines its own abnormality through the local abnormality determining circuit 36 or 38 and stops controlling only that which it controls. When an abnormality occurs in the local ECU 10 or 11, therefore, the controlling operations of the mating ECU 11 or 10 are not stopped.

According to this embodiment, the ECUs 10 and 11 can independently control the control targets associated with the left and right banks 4a and 4b of the engine 4 and can determine abnormalities such as line disconnection associated with the communication lines 45 and 46. When an abnormality occurs in the communication line 45 or 46, therefore, the mating ECU 11 or 10 can reliably determine the event and turn on the alarm lamp 34. Further, each ECU 10 or 11 can reliably control its own control targets. When an abnormality occurs in the communication line 45 or 46, therefore, nothing wrong happens in the ECU 11 or 10 before the driver is informed of the abnormality by the lighting of the alarm lamp 34.

According to this embodiment, a main CPU 21 or 26 and a sub CPU 22 or 27, which monitors the main CPU are provided for each ECU 10 or 11. High performance is not required of the sub CPUs 22 and 27. They should merely have a capacity of 1-bit of information. Therefore, the additional provision of the sub CPUs 22 and 27 does not complicate the structures of the ECUs 10 and 11 or greatly increase the cost.

Although only one embodiment of the present invention has been described herein, it should be apparent to those skilled in the art that the present invention may be embodied in many other specific forms without departing from the spirit or scope of the invention. Particularly, it should be understood that this invention may be embodied in the following forms.

In the above-described embodiment, a pair of communication lines 45 and 46 are provided between the ECUs 10 and 11 to permit both ECUs 10 and 11 to exchange communication data. The functions of those communication lines 45 and 46 may be given to a single bus line to accomplish such data exchange in serial communication.

In this embodiment, the targets the control of which is to be stopped by the abnormality determining circuits 36 and 38 in the ECUs 10 and 11, are the fuel supply devices and the linkless throttle valves 13a and 13b. The targets, the control of which is to be stopped by the abnormality determining circuits 36 and 38, may be either the fuel supply devices or the throttle valves.

Alternatively, the power supplies of the motors 14a and 14b associated with the linkless throttle valves 13a and 13b may be designed as separate from the fuel supply devices so that when an abnormality occurs in the main CPU 21 or 26, the power supply to the associated motor 13a or 13b is stopped.

In this embodiment, the abnormality determining circuit 36 or 38 determines an abnormality in the local ECU 10 or 11 based on the determination output of the associated OR gate 35 or 37 which has received the monitoring results of each main CPU 21 or 26 and each sub CPU 22 or 27 in the local ECU 10 or 11. A modification may be made so that each abnormality determining circuit 36 or 38 in each ECU 10 or 11 directly receives the monitoring result of each sub CPU 22 or 27 to determine an abnormality in the local ECU 10 or 11. This is because when the operation of each main CPU 21 or 26 is abnormal, each sub CPU 22 or 27 outputs a signal reflecting the abnormality. Another reason is that when the main CPU 21 or 26 is abnormal, the control of the control targets should be limited.

In this embodiment, the operational state of each main CPU 21 or 26 in the ECU 10 or 11 is monitored by the associated power IC 23 or 28. Further, the power ICs 23 and 28 are designed to be able to stop power supply to the associated main CPUs 21 and 26 when necessary. Those power ICs 23 and 28 may however be omitted.

Therefore, the present examples and embodiment are to be considered as illustrative and not restrictive and the invention is not to be limited to the details given herein, but may be modified within the scope of the appended claims.

What is claimed is:

1. An electronic control apparatus for a vehicle, wherein said apparatus executes a plurality of controls associated with driving of the vehicle, said apparatus comprising:

a first computer and a second computer for independently executing controls, wherein each computer is functionally assigned to and executes at least one associated control, and wherein each computer monitors operational states of other computer;

a main processor and an associated sub processor provided in each computer, wherein the main processor executes the assigned control and monitors an operational state of the associated sub processor and determines whether the operational state of the associated sub processor is abnormal, and wherein the sub processor monitors an operational state of the main processor associated therewith and determines whether the operational state of the associated main processor is abnormal;

a transmitting means associated with each computer, wherein the transmitting means transmits a determining signal to the other computer when at least one of the main processor and the sub processor in the associated computer determines that the operational state of the other processor is abnormal;

an abnormality detecting means provided in each computer, wherein the abnormality detecting means detects an abnormality of the other computer based on the determining signal transmitted from the transmitting means of the other computer;

a warning means for warning of the abnormality, wherein the warning means operates when the abnormality detecting means detects an abnormality of the other computer; and a restricting means associated with each computer, wherein each restricting means restricts execution of at least one assigned control of the associated computer when at least one of the main processor and the sub processor determines that the operational state of the other processor is abnormal.

2. The apparatus as set forth in claim 1, wherein each computer includes a power circuit associated therewith, wherein the power circuit supplies power to the main processor in the associated computer and monitors operational state of the main processor and determines whether the operational state of the main processor is abnormal, and wherein the power circuit transmits a reset signal that forcibly prohibits operation of the main processor when the power circuit determines that the monitored operational state is abnormal.

3. The apparatus as set forth in claim 2, wherein each main processor has a transmitting means to transmit a dynamic signal to the associated power circuit when the operational state of the main processor is normal, and wherein each power circuit has a monitoring means to monitor the dynamic signal transmitted from the associated main processor and wherein each monitoring means determines the operational state of the associated main processor based on the dynamic signal.

4. The apparatus as set forth in claim 1, wherein the vehicle includes a V-type engine having a first bank and a second bank, wherein each bank is supplied with air for combustion and includes a linkless throttle valve to adjust an amount of the supplied air, wherein the main processor of the first computer controls the throttle valve of the first bank and wherein the main processor of the second computer controls the throttle valve of the second bank.

5. The apparatus as set forth in claim 4, wherein the vehicle has an automatic transmission that is driven by the engine, and wherein the main processor of the first computer additionally controls the transmission.

6. The apparatus as set forth in claim 1, wherein each main processor and the associated sub processor has a monitoring means to monitor an operational state of the other, and wherein each main processor and the associated sub processor has a transmitting means to transmit a dynamic signal to the monitoring means of the other when the operational state of the other is normal, and wherein the monitoring means of each main processor determines the operational state of the associated sub processor based on the transmitted dynamic signal from the associated sub processor and wherein the monitoring means of each sub processor determines the operational state of the associated main processor based on the transmitted dynamic signal from the associated main processor.

7. An electronic control apparatus for a vehicle, wherein said apparatus executes a plurality of controls associated with driving of the vehicle, said apparatus comprising:

a first computer and a second computer for independently executing controls wherein each computer is functionally assigned to and executes at least one associated control, and wherein each computer monitors operational states of other computer;

at least one communication line for allowing the first computer and the second computer to exchange predetermined data necessary for controls with each other;

at least one monitor line for allowing the first computer and the second computer to exchange predetermined signals necessary for monitoring the operational states of the computers with each other;

a main processor and an associated sub processor provided in each computer, wherein the main processor executes at least one assigned control;

a monitoring means provided in the main processor and the associated sub processor in the each computer, wherein the monitoring means allows associated the processors to exchange predetermined signals with each other necessary for monitoring their operational states and for determining whether the operational state of the associated processor is normal;

a communicating means provided in each computer, wherein the communicating means allows each computer to exchange a first dynamic signal, which inverts every given period, with the predetermined data by way of the communication line when the operational state of each computer is normal;

a transmitting means provided in each computer, wherein the transmitting means transmits a second dynamic signal, which inverts every given period, to the other computer by way of the monitor line when the monitoring means of each processor determines that the operational state of the other processor is normal, and wherein each transmitting means transmits a signal other than the second dynamic signal to the other computer by way of the monitor line when at least one monitoring means of the processors determines that the operational state of the other processor is abnormal; and abnormality detecting means provided in each computer, wherein the abnormality detecting means detects an abnormality of the other computer to monitor both the first dynamic signal and the second dynamic signal transmitted from the other computer by way of the communication line and the monitor line.

8. The apparatus as set forth in claim 7, wherein each computer has a restricting means associated therewith, wherein each restricting means restricts execution of at least one assigned control of the associated computer when the transmitting means of the same computer transmits the signal other than the second dynamic signal to the other computer indicating that the operational state of the computer is abnormal.

9. The apparatus as set forth in claim 8, wherein each computer includes a power circuit associated therewith, wherein the power circuit supplies power to the main processor in the associated computer and monitors operational state of the main processor and determines whether the operational state of the main processor is abnormal, and wherein the power circuit transmits a reset signal that forcibly prohibits operation of the main processor when the power circuit determines that the monitored operational state is abnormal.

10. The apparatus as set forth in claim 9, wherein each main processor has a transmitting means to transmit a dynamic signal to the associated power circuit when the operational state of the associated main processor is normal, and wherein each power circuit has a monitoring means to monitor the dynamic signal transmitted from the associated main processor and wherein each monitoring means determines the operational state of the associated main processor based on the dynamic signal.

11. The apparatus as set forth in claim 8, wherein the vehicle includes a V-type engine having a first bank and a second bank, wherein each bank is supplied with air for combustion and includes a linkless throttle valve to adjust an amount of the supplied air, wherein the main processor of the first computer controls the throttle valve of the first bank and wherein the main processor of the second computer controls the throttle valve of the second bank.

12. The apparatus as set forth in claim 11, wherein the vehicle has an automatic transmission that is driven by the engine, and wherein the main processor of the first computer additionally controls the transmission.

13. The apparatus as set forth in claim 8 further comprising a warning means for warning of an abnormality, wherein the warning means operates when the abnormality detecting means detects an abnormality of the other computer.

14. The apparatus as set forth in claim 8, wherein each main processor and the associated sub processor has a monitoring means to monitor an operational state of the other, and wherein each main processor and the associated sub processor has a transmitting means to transmit a dynamic signal to the monitoring means of the other when the operational state of the other is normal, and wherein the monitoring means of each main processor determines the operational state of the associated sub processor based on the transmitted dynamic signal from the associated sub processor and wherein the monitoring means of each sub processor determines the operational state of the associated main processor based on the transmitted dynamic signal from the associated main processor.

15. The apparatus as set forth in claim 7, wherein each computer includes a power circuit associated therewith, wherein the power circuit supplies power to the main processor in the associated computer and monitors operational state of the main processor and determines whether the operational state of the main processor is abnormal, and wherein the power circuit transmits a reset signal that forcibly prohibits operation of the main processor when the power circuit determines that the monitored operational state is abnormal.

16. The apparatus as set forth in claim 15, wherein each main processor has a transmitting means to transmit a dynamic signal to the associated power circuit when the operational state of the associated main processor is normal, and wherein each power circuit has a monitoring means to monitor the dynamic signal transmitted from the associated main processor and wherein each monitoring means determines the operational state of the associated main processor based on the dynamic signal.

17. The apparatus as set forth in claim 7, wherein the vehicle includes a V-type engine having a first bank and a second bank, wherein each bank is supplied with air for combustion and includes a linkless throttle valve to adjust an amount of the supplied air, wherein the main processor of the first computer controls the throttle valve of the first bank and wherein the main processor of the second computer controls the throttle valve of the second bank.

18. The apparatus as set forth in claim 17, wherein the vehicle has an automatic transmission that is driven by the engine, and wherein the main processor of the first computer additionally controls the transmission.

19. The apparatus as set forth in claim 7 further comprising a warning means for warning of an abnormality, wherein the warning means operates when the abnormality detecting means detects an abnormality of the other computer.

20. The apparatus as set forth in claim 7, wherein each main processor and the associated sub processor has a monitoring means to monitor an operational state of the other, and wherein each main processor and the associated sub processor has a transmitting means to transmit a dynamic signal to the monitoring means of the other when the operational state of the other is normal, and wherein the monitoring means of each main processor determines the operational state of the associated sub processor based on the transmitted dynamic signal from the associated sub processor and wherein the monitoring means of each sub processor determines the operational state of the associated main processor based on the transmitted dynamic signal from the associated main processor.

* * * * *